(12) United States Patent
Nishitani

(10) Patent No.: US 6,504,125 B2
(45) Date of Patent: Jan. 7, 2003

(54) GAS-FILLED SWITCHING APPARATUS

(75) Inventor: Junichiro Nishitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,289

(22) Filed: Nov. 19, 2001

(65) Prior Publication Data
US 2002/0063111 A1 May 30, 2002

(30) Foreign Application Priority Data
Nov. 30, 2000 (JP) ..................................... 2000-365414

(51) Int. Cl.[7] .............................................. H01M 33/70
(52) U.S. Cl. .............................. 218/68; 218/155; 218/67
(58) Field of Search ............................ 218/55, 67, 118, 218/120, 134, 154, 138, 155, 139, 97, 68, 70

(56) References Cited

U.S. PATENT DOCUMENTS 5,175,403 A * 12/1992 Hamm et al. ............... 218/120
5,543,598 A * 8/1996 Duffour et al. ............. 218/134

FOREIGN PATENT DOCUMENTS

| DE | 37 15 105 A1 | 11/1987 | |
|----|----|----|----|
| EP | 0 198 181 A1 | 10/1986 | |
| EP | 1 032 003 A2 | 8/2000 | |
| JP | 53-15615 | 2/1978 | ............ F16J/13/06 |

OTHER PUBLICATIONS

Abstract.

* cited by examiner

*Primary Examiner*—Lincoln Donovan
*Assistant Examiner*—M. Fishman
(74) *Attorney, Agent, or Firm*—Sughrue Mion, PLLC

(57) ABSTRACT

A gas-filled switching apparatus has a gas-filled sealed container having a container body with a neck which surrounds an opening and a flange which extends outwards from the neck. A cover is disposed on the flange to cover the opening, and a gasket is disposed between the cover and the flange to form a seal around the opening. A plurality of clamps detachably secure the cover to the flange. Each clamp includes an adjustable pressing member exerting a clamping force on the cover and the flange.

6 Claims, 5 Drawing Sheets

GAS-FILLED SWITCHING APPARATUS

REFERENCE TO RELATED APPLICATIONS

This application is based on Japanese Patent Application No. 2000-365414, filed in Japan on Nov. 30, 2000, the contents of which are hereby incorporated by reference.

BACKGROUND OF THE INVENTION

1. Field of the Invention

This invention relates to a switching apparatus for electric power filled with an electrically insulating gas. In particular, it relates to a gas-filled switching apparatus having an improved sealed container for housing switches or other components of the switching apparatus.

2. Description of the Related Art

FIG. 5 is a schematic side elevation of a cubicle-type gas insulated switching apparatus of the type to which the present invention relates. Switches such as disconnecting switches 201 and 302, a circuit breaker 301, and a grounding switch 303 are housed in sealed containers 2 and 3 provided inside a metal box 1. An electrically insulating gas fills the sealed containers 2 and 3. The insulating breakdown voltage of the insulating gas is roughly proportional to its pressure, so the gas is typically charged to a gauge pressure on the order of 0.03–0.2 MPa to enable the separation between components within the containers 2 and 3 to be decreased and thereby decrease the overall size of the switching apparatus.

Sulfur hexafluoride (SF6) is frequently used as the electrically insulating gas in the sealed containers 2 and 3. However, because sulfur hexafluoride has the capability of contributing to global warming, there are restrictions on its discharge into the atmosphere, so there is now an interest in the use of other electrically insulating gases for this purpose. One gas which can be used as a replacement for sulfur hexafluoride is dry air. However, dry air has a lower dielectric strength than sulfur hexafluoride gas, so it is necessary to pressurize dry air to a higher pressure than required for sulfur hexafluoride to obtain a comparable dielectric strength.

The sealed containers 2 and 3 are usually equipped with covers which can be detachably mounted on thick flanges surrounding openings at the ends of the containers. An airtight seal is formed between each cover and the corresponding flange by an annular elastic gasket which is received in a gasket groove formed in the front surface of the flange and clamped between the cover and the flange.

In some arrangements, a cover is secured to a flange by bolts. In other arrangements, a cover is secured to a flange by clips which fit over the cover and the flange and press them towards each other.

When bolts are used to secure a cover to a flange, the flange must be large enough to accommodate the bolts and bolt holes for receiving the bolts as well as the gasket groove, so there is the problem that the outer dimensions of the flange end up being large, which increases the overall size of the sealed container. Furthermore, as the dimensions of a flange increase, the distance from the support point of the flange to the location where a load is applied to the flange tends to be large, so the bending stresses at the support point become large, and the flange must be thick in order to resist the bending stresses.

When clips are used to secure a cover to a flange, it is unnecessary to provide bolt holes in the flange, so the width of the flange and the outer dimensions of the container as a whole can be decreased. Furthermore, the bending stresses applied to the flange can be lower than when bolts are used. However, the clips must exert a compressive force which can resist the gas pressure within the container to prevent the cover from becoming detached from the flange. And the gasket exerts an elastic force to the clips when compressed. Therefore, frictional forces generate between the clips, the cover and the flange by the compressive force by the clips and the elastic force by the gasket when the clips are installed on the cover and the flange. Due to these frictional forces, it is generally not possible to install or remove the clips by hand, and a special clip installation device is necessary for this purpose. When a cubicle-type gas-filled switching apparatus is installed in a confined space, there may be insufficient room for the clip installation device to operate, making installation and repair difficult.

SUMMARY OF THE INVENTION

The present invention provides a gas-filled switching apparatus having a sealed container with a cover which can be easily mounted on the container by hand to form a reliable airtight seal.

The present invention also provides a gas-filled switching apparatus having a sealed container which can withstand a high internal gas pressure.

The present invention additionally provides a gas-filled switching apparatus having a sealed container which can be small in size.

According to one form of the present invention, a gas-filled switching apparatus includes a sealed container containing an electrically insulating gas and a switch. The container includes a container body having a neck which surrounds an opening and a flange which extends outwards from the neck, a cover disposed on the flange and covering the opening, and a gasket disposed between the cover and the flange and forming a seal around the opening. An outer periphery of the flange lies inside an outer periphery of the container body as viewed in an axial direction of the container body. The container also includes a plurality of clamps detachably securing the cover to the flange. Each clamp receives a peripheral edge of the cover and the flange and includes an adjustable pressing member exerting a clamping force on the cover and the flange.

In preferred embodiments, the pressing member is a set screw. Preferably the set screw has a line of action passing through the gasket.

In preferred embodiments, the clamp has a generally U-shaped cross section with a pair of legs. One of the legs may flare away from the other leg at its end. The pressing member may be mounted on one of the legs.

In preferred embodiments, the gasket is received in a groove formed in the cover. The groove may be formed by a variety of methods, such as by press working or by machining.

In one preferred embodiment, a reinforcing plate is provided between the pressing member and either the cover or the flange so as to prevent abnormal deformation of the gasket by the clamping force of the pressing member.

DESCRIPTION OF PREFERRED EMBODIMENTS

Figure 1:
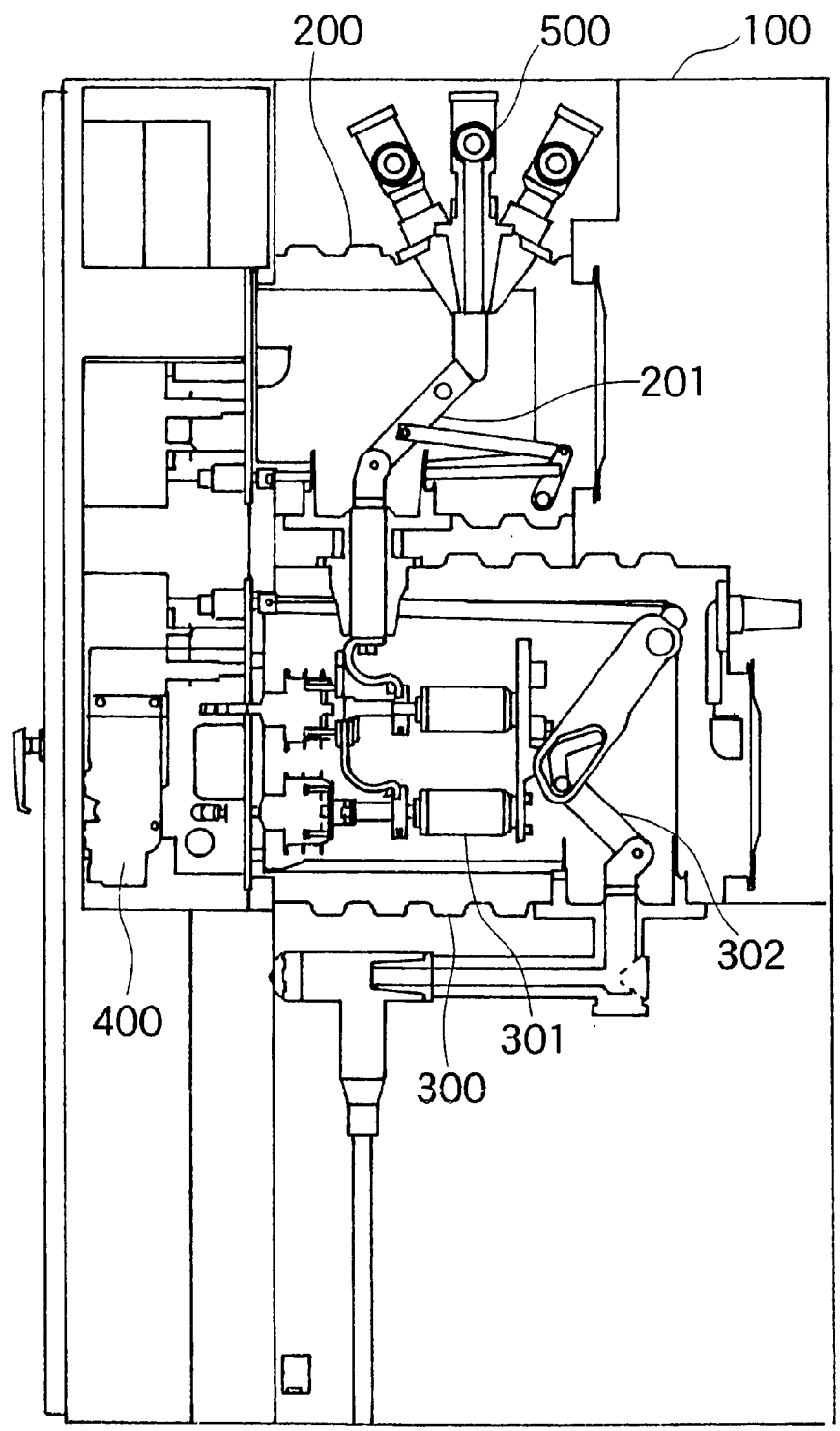
FIG. 1 is a schematic side elevation of the interior of an embodiment of a gas-filled switching apparatus according to the present invention.
Figure 5:
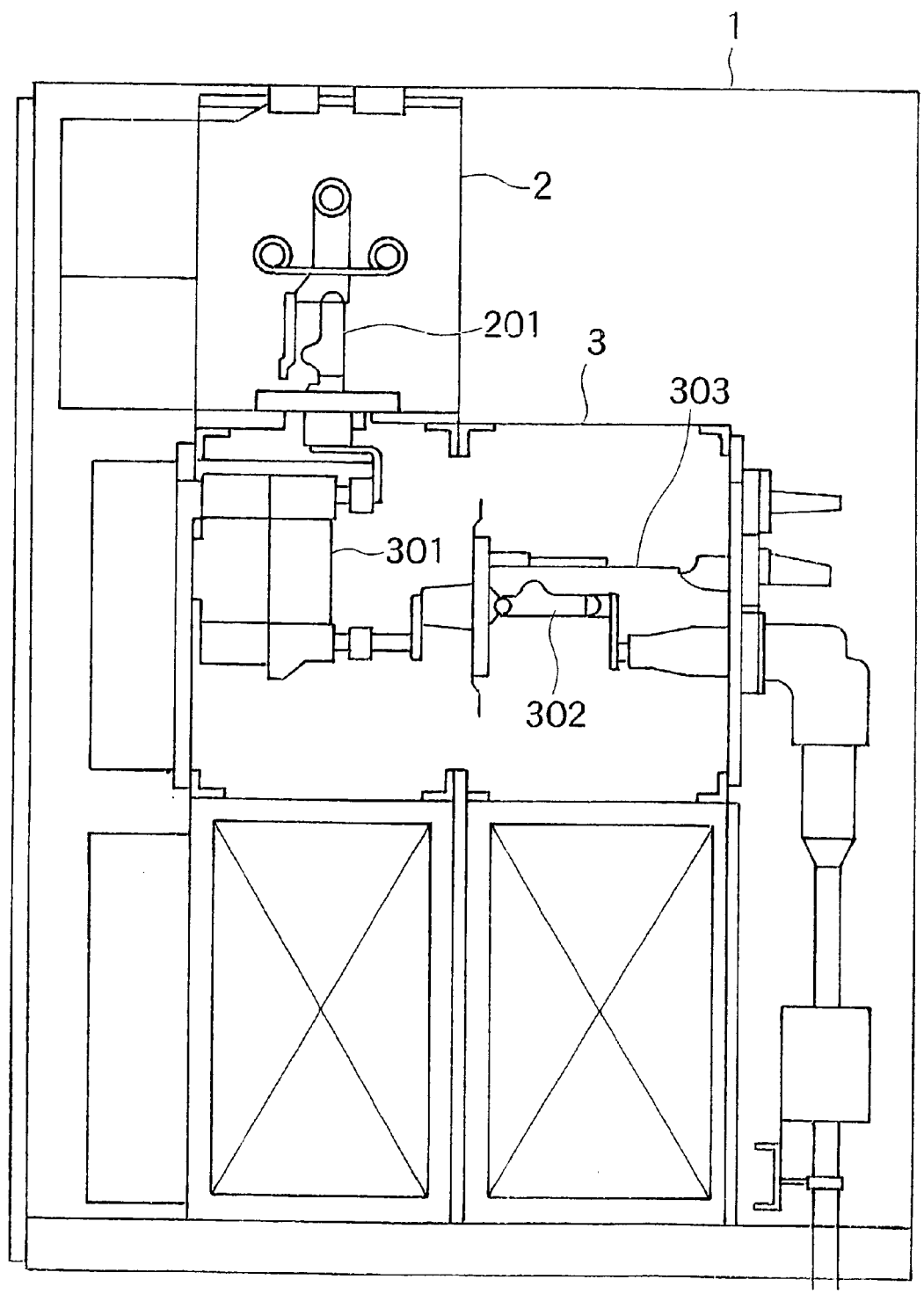
FIG. 5 is a schematic elevation of the interior of a gas-filled switching apparatus of the type to which the present invention relates.

FIG. 1 is a shcematic side elevation of the interior of an embodiment of a gas-filled switching apparatus according to the present invention. Parts which are the same as or correspond to those of the cubicle-type gas-filled switching apparatus of FIG. 5 are indicated by the same reference numerals. The illustrated switching apparatus performs switching between a live bus line 500 and a load. It includes a first sealed container 200 and a second sealed container 300 which are installed together with an operating portion 400 on the side surface of the interior of a metal box 100. A bus line side disconnecting switch 201 is housed within the first sealed container 200 and is connected to the bus line 500. A circuit breaker 301 is housed within the second sealed container 300 and is connected to the disconnecting switch 201. A load side disconnecting switch 302 is also housed within the second sealed container 300 and is connected to the circuit breaker 301.

Figure 2:
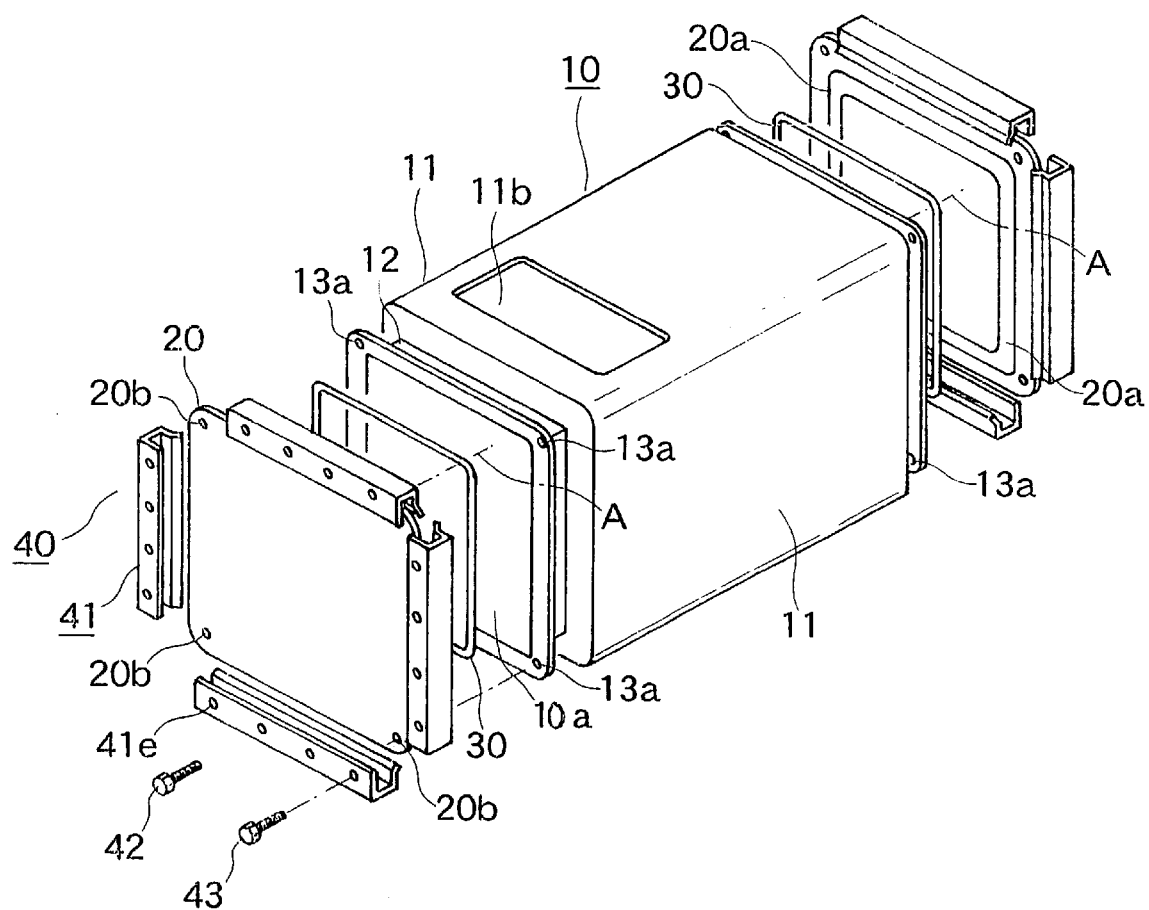
FIG. 2 is an exploded isometric view of one of the sealed containers of the gas-filled switching apparatus shown in FIG. 1.

FIG. 2 is an exploded isometric view of the first sealed container 200. The second sealed container 300 has a similar structure to the first sealed container 200, so an explanation of the second sealed container 300 will be omitted. The first sealed container 200 includes a hollow container body 10 with a longitudinal axis A. The container body 10 is open at each end and has a roughly rectangular transverse cross section. At each of its ends, the container 200 includes a neck 12 which surrounds a substantially rectangular opening 10a and a flange 13 which extends outwards from the neck 12. A roughly rectangular cover 20 for closing the opening 10a is mounted on each flange 13 and is secured to the flange 13 by a plurality of clamps 40. An airtight seal is formed around each opening 10a by an annular elastic gasket 30 which is sandwiched between the cover 20 and the flange 13.

The container body 10 includes a trunk 11 extending between the necks 12 and having a bushing installation hole 11b formed in it. When the container body 10 is viewed along its longitudinal axis A, the necks 12 and the outer peripheries of the flanges 13 lie inside the outer periphery of the trunk 11 of the container body 10. The outer peripheries of the clamps 40 also lie within the outer periphery of the trunk 11 when the container body 10 is viewed in the direction of axis A, so the container 200 can be compact. The openings 10a defined by the necks 12 may have the minimum size necessary to permit the circuit breaker 301, the disconnecting switches 201, 302, and other equipment to be installed in the container body 10 without being impeded by the openings 10a. Each flange 13 may have bolt holes 13a in its four corners for installing the corresponding cover 20 on the flange 13. Each flange 13 has a width sufficient to accommodate the clamps 40 installed on it. The trunk 11, the necks 12, and the flanges 13 of the container body 10 are integrally joined to each other in an airtight manner such that gas will not leak out of the connections between the different portions of the container body 10.

The cover 20 has the same outer shape as the flange 13 and has bolt holes 20b in its four corners. The cover 20 is secured to the flange 13 by bolt 43 utilizing the bolt holes 20b and the bolt holes 13a in the flange 13. A gasket groove 20a for receiving an annular gasket 30 is formed in the cover 20 near its outer edge. The gasket groove 20a has dimensions such that a gasket 30 disposed in the groove 20a can be in sealing contact with both the cover 20 and the opposing surface of the flange 13.

Figure 3:
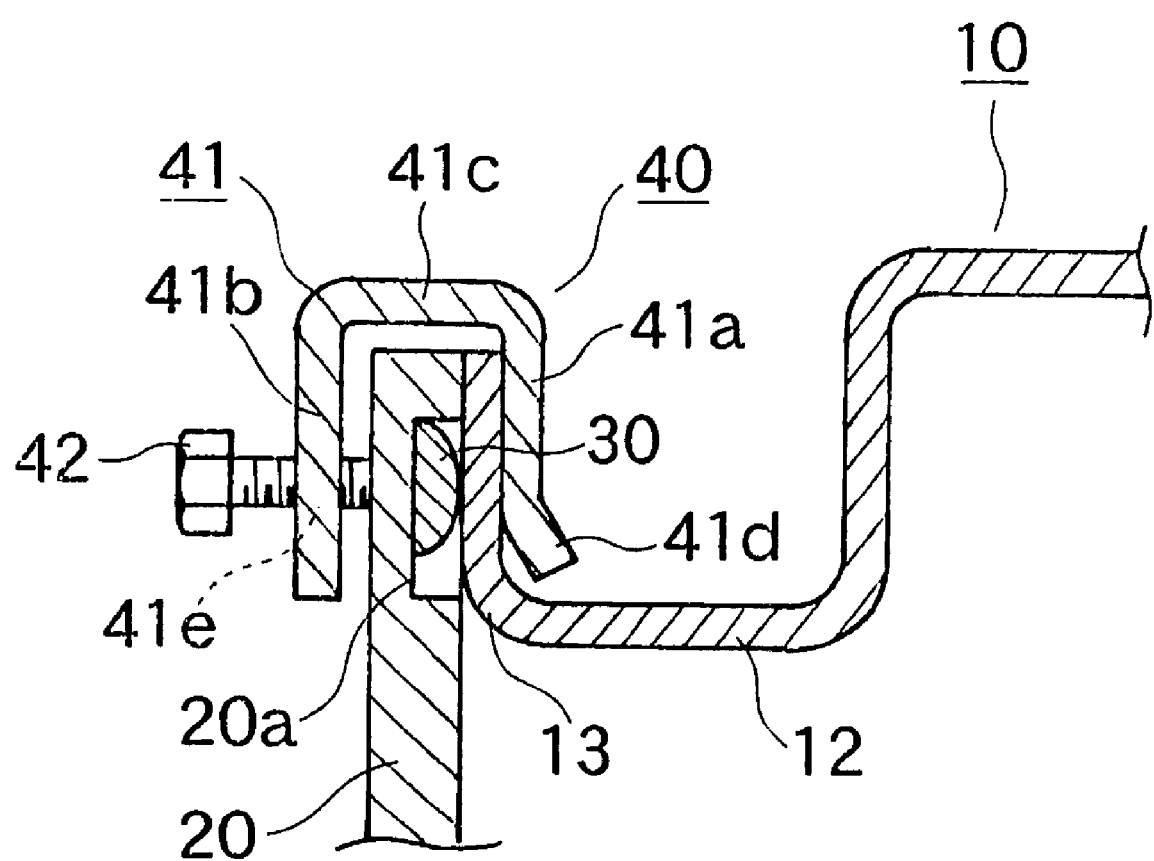
FIG. 3 is a cross-sectional elevation of a portion of the sealed container of FIG. 2, showing how a cover is clamped to a flange of the container.

As shown in FIG. 3, each clamp 40 includes a base 41 with a substantially U-shaped cross section, and a pressing member in the form of a set screw 42 for pressing the cover 20 against the flange 13. The base 41 includes first and second legs 41a and 41b and a connecting portion 41c connected between the legs 41a and 41b. A tongue 41d which flares away from the second leg 41b is formed on the free end of the first leg 41a, and a screw hole 41e which threadingly engages and guides the set screw 42 is formed in the second leg 41b. Each clamp 40 is disposed on one of the four sides of the cover 20 with the peripheral edge of the cover 20 and the opposing flange 13 disposed between legs 41a and 41b. When the set screws 42 are tightened so as to press against the outer surfaces of the cover 20, the cover 20 and the flange 13 are clamped to each other, and the gasket 30 is pressed into sealing contact with the opposing surfaces of the gasket groove 20a and the flange 13 to form an airtight seal. Preferably the line of action of the clamping force exerted by each set screw 42 on the outer surface of the cover 20 passes through the gasket 30. The distance between the two legs 41a and 41b of each base 41 is preferably greater than the combined thickness of the cover 20 and the flange 13 so that the base 41 can be easily installed on the peripheral edge of the cover 20 and the flange 13.

The interior of each of the sealed containers 200 and 300 is filled with an electrically insulating gas (such as dry air), which is pressurized to a level which will provide a suitable breakdown voltage.

By having the set screws 42 of the clamps 40 press directly on the outer surfaces of the covers 20 opposite the gasket grooves 20a, each gasket 30 can be efficiently pressed against the opposing surface of the flange 13, and a seal can be obtained which can withstand high pressures.

It is not necessary to provide bolt holes in the flanges 13 for use in pressing a cover 20 against the flange 13, so the width of the flanges 13 and the overall outer dimensions of the sealed container 200 can be decreased. In addition, large bending stresses are not produced at the connection between the flanges 13 and the necks 12, so the flanges 13 do not need to be thick.

The gasket groove 20a may be formed in a cover 20 by various methods, depending upon factors such as the structure of the cover and the necessary dimensional accuracy of the groove 20a. If the cover 20 is thick or requires a high dimensional accuracy, machining of the gasket groove 20a may be appropriate. If the cover 20 is sufficiently thin and the gasket groove 20a does not required high dimensional accuracy, it may be advantageous to form the groove 20a by press working, which is a simple, rapid, and economical method.

The number of set screws 42 which are used as pressing members in each clamp 40 can be selected in accordance with considerations such as the size of the sealed container, its internal pressure, and the size of the set screws 42 and the base 41 of the clamp 40. Generally, it is preferable to dispose the set screws 42 with a fairly equal spacing to obtain a more uniform pressure distribution.

Instead of the set screw 42 contacting the outer surface of the cover 20, the orientation of the clamp 40 can be reversed so that the set screw acts against the surface of the flange 13 facing towards the container body 10, with the flange 13, the cover 20, and the gasket 30 being clamped between the set screws 42 and the first legs 41a of the clamps 40.

Members other than set screws 42 can be used as pressing members for clamping the covers 20 and the flanges 13 to each other, such as wedges.

Figure 4:
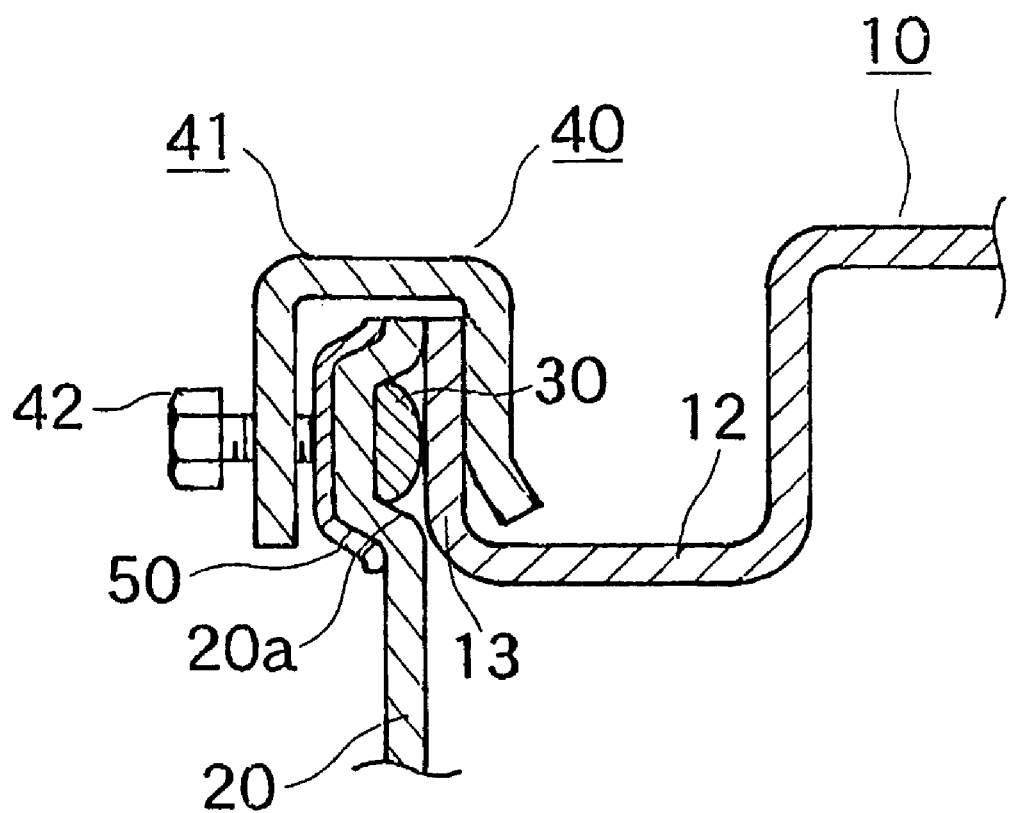
FIG. 4 is a cross-sectional elevation of a portion of a sealed container of another embodiment of the present invention, showing how a cover is clamped to a flange of the container.

FIG. 4 is a cross-sectional elevation of a portion of a sealed container 200 of another embodiment of the present invention. In this embodiment, a reinforcing plate 50 (such as an iron plate or a stainless steel plate) is provided on the outer surface of the cover 20 along each of its sides in a location corresponding to the gasket groove 20a. The structure of the sealed container 200 is otherwise the same as that of the previous embodiment. The second sealed container 300 may have a similar structure to that shown in FIG. 4. The reinforcing plate 50 prevents the gasket groove 20a from undergoing undesirable deformation under the clamping force of the set screws 42 and thereby maintains the gasket 30 in a suitable shape for forming an airtight seal. The reinforcing plate 50 permits the cover 20 to be made of a thin material, such as one suitable for forming by press working. When the set screws 42 of the clamps 40 act on the flange 13 instead of on the cover 20, similar reinforcing plates 50 may be provided on the portions of the flange 13 to be contacted by the set screws 42.

As described above, according to one form of the present invention, a gas-filled switching apparatus includes a sealed container containing an electrically insulating gas and a switch disposed, with the container having a container body having a neck which surrounds an opening and a flange which extends outwards from the neck, a cover disposed on the flange and covering the opening, a gasket disposed between the cover and the flange and forming a seal around the opening, with an outer periphery of the flange lying inside an outer periphery of the container body as viewed in an axial direction of the container body, and a plurality of clamps detachably securing the cover to the flange, with each clamp receiving a peripheral edge of the cover and the flange and including an adjustable pressing member exerting a clamping force on the cover and the flange. Therefore, a gas-filled switching apparatus can be obtained which is compact and which has a sealed container which is capable of resisting a high pressure and which can be easily and reliably sealed.

Furthermore, by employing a set screw having a line of action passing through the gasket as a pressing member, a gas-filled switching apparatus can be obtained which has a sealed container which is capable of resisting a high pressure and which can be easily and reliably sealed.

In addition, by forming each clamp with a pair of legs between which the cover and the flange are disposed, with one of the legs having an end which flares away from the other leg, and with the pressing member being mounted on the other leg, the clamps can be easily installed, and the sealed container can be sealed with certainty.

Also, when the cover has a gasket groove for receiving the gasket formed therein by press working, the cover can be easily and efficiently manufactured.

When a gasket groove for receiving the gasket is formed in the cover by machining, a gas-filled switching apparatus can be obtained which has a cover with a high resistance to pressure.

Furthermore, by providing a reinforcing plate for contact by the pressing member on the cover or the flange, undesirable deformation of the gasket under the clamping force of the pressing member can be prevented, so a gas-filled switching apparatus can be obtained which has a sealed container having reliable sealing performance.

What is claimed is:

1. A gas-filled switching apparatus comprising a sealed container containing an electrically insulating gas and a switch, the container comprising a container body having a neck which surrounds an opening and a flange which extends outwards from the neck, the flange and the neck being integral to the container body, a cover disposed on the flange and covering the opening, a gasket disposed between the cover and the flange and forming a seal around the opening, an outer periphery of the flange lying inside an outer periphery of the container body as viewed in an axial direction of the container body, and a plurality of clamps detachably securing the cover to the flange, each clamp receiving a peripheral edge of the cover and the flange and including an adjustable pressing member exerting a clamping force on the cover and the flange.

2. A gas-filled switching apparatus as claimed in claim 1 wherein the pressing member comprises a set screw, and a line of action of a clamping force exerted by the set screw passes through the gasket.

3. A gas-filled switching apparatus as claimed in claim 1 wherein each clamp includes a pair of legs between which the cover and the flange are disposed, one of the legs has an end which flares away from the other leg, and the pressing member is mounted on the other leg.

4. A gas-filled switching apparatus as claimed in claim 1 wherein the gasket is received in a press worked groove in the cover.

5. A gas-filled switching apparatus as claimed in claim 1 wherein the gasket is received in a machined groove in the cover.

6. A gas-filled switching apparatus as claimed in claim 1 wherein a one of the cover and the flange is provided with a reinforcing plate contacted by the pressing members of the clamps.

* * * * *